(12) United States Patent
Ahmed et al.

(10) Patent No.: US 7,254,897 B2
(45) Date of Patent: Aug. 14, 2007

(54) INTEGRATED TILT SENSOR

(75) Inventors: Saleh Ahmed, Simi Valley, CA (US); Gary Casey, Thousand Oaks, CA (US)

(73) Assignee: Kavlico Corporation, Morrpark, CA (US)

( * ) Notice: Subject to any disclaimer, the term of this patent is extended or adjusted under 35 U.S.C. 154(b) by 213 days.

(21) Appl. No.: 11/106,027

(22) Filed: Apr. 13, 2005

(65) Prior Publication Data

US 2006/0232736 A1    Oct. 19, 2006

(51) Int. Cl.
*G01C 9/06* (2006.01)
(52) U.S. Cl. .................. 33/366.19; 33/366.25
(58) Field of Classification Search ............. 33/366.19, 33/366.25
See application file for complete search history.

(56) References Cited

U.S. PATENT DOCUMENTS

| | | | | |
|---|---|---|---|---|
| 5,083,383 A | * | 1/1992 | Heger | ..................... 33/366.19 |
| 5,627,316 A | * | 5/1997 | De Winter et al. | ...... 73/514.32 |
| 6,351,892 B1 | * | 3/2002 | Mercer et al. | ........... 33/366.15 |
| 6,625,896 B1 | * | 9/2003 | Olson | ...................... 33/366.15 |
| 6,993,849 B1 | * | 2/2006 | Campbell et al. | ........ 33/366.19 |

* cited by examiner

*Primary Examiner*—Christopher W Fulton
(74) *Attorney, Agent, or Firm*—Jeffer, Mangels, Butler & Marmaro LLP

(57) ABSTRACT

A tilt sensor having a printed circuit board disposed in a direction normal to a reference plane for measuring a tilt angle with a pair of electrodes formed on a first surface of the printed circuit board. A cover is affixed to the printed circuit board and creates a cavity between the cover and the printed circuit board with a predetermined gap between the cover and the pair of electrodes, the cover acting as a common electrode to the pair of electrodes to create a pair of capacitors. An inert liquid is contained in the cavity, the surface level of the inert fluid varying according to the tilt angle of the reference plane. A signal processing circuit is formed on a second surface of the printed circuit board that produces an output signal corresponding to a difference in capacitance between the two capacitors as a tilt angle detection output.

39 Claims, 16 Drawing Sheets

INTEGRATED TILT SENSOR

FIELD OF THE INVENTION

The present invention relates generally to sensors, and more particularly, to an integrated tilt sensor.

BACKGROUND OF THE INVENTION

Liquid levels, such as a carpenter level, utilize the interplay between a surface of a liquid and gravity to measure whether a surface is level. The principles of a liquid level can be applied to detecting angular motion. Angle detection devices provide an output voltage proportional to tilt angle where tilting the sensor off level will cause an unbalanced electrical signal. Initial commercial electric liquid tilt sensors were electrolytic tilt sensors. These devices provided an output voltage proportional to tilt angle where tilting the sensor caused an unbalanced resistance to a common electrode. Liquid angle sensors using similar principles but with differential capacitive (as opposed to resistive) sensing have also gained popularity in use.

In current sensor designs, the signal conditioning electronics, and the sense elements, are typically located on two separate ceramic substrates. Due to this separation, interconnections between the signal conditioning electronics and the sense elements are cumbersome and unreliable. In addition, the requirements of the interconnections create numerous packaging constraints. The construction also suffers from poor temperature tracking between the electronics and the sense elements.

Accordingly, there is a need to overcome the long felt problems noted above.

SUMMARY OF THE PREFERRED EMBODIMENTS

The present invention provides a tilt sensor that is integrated to provide both the sensing element as well as the signal processing circuitry to generate high-level signals appropriate for use by downstream circuitry.

It is a preferred object of the present invention to provide a tilt sensor that includes a circuit board having a first side and a second side, with a circuit located on the first side, and a pair of capacitors coupled to the circuit. The pair of capacitors includes a pair of electrodes on the second side, a metal ring surrounding the pair of electrodes on the second side, and, a cover sealed to the metal ring and spaced from the pair of electrodes to act as a common electrode for the pair of electrodes to form the pair of capacitors, the cover having a cavity, wherein the pair of electrodes and the metal ring are electrically coupled to the circuit.

It is also a preferred object of the present invention to provide a method for assembling a tilt sensor using a circuit board. The method includes the steps of forming a pair of differential electrodes on a first side of the circuit board and forming an electrical circuit on a second side of the circuit board. The method also includes the steps of creating a plurality of through holes in the differential electrodes, forming a metal ring around the pair of differential electrodes and coupling the electrical circuit to the pair of differential electrodes and the metal ring. The method further includes the steps of attaching a cover to the metal ring to form a cavity, filling the cavity with a nonconductive liquid, and sealing the plurality of through holes.

It is yet another preferred object of the present invention to provide a tilt sensor having a printed circuit board disposed in a direction normal to a reference plane for measuring a tilt angle, with a pair of electrodes formed on a first surface of the printed circuit board and a cover affixed to the printed circuit board and creating a cavity between the cover and the first surface of the printed circuit board, the cover being adjacent to the pair of electrodes with a predetermined gap between the cover and the pair of electrodes, the cover acting as a common electrode to the pair of electrodes to create a pair of capacitors. The tilt sensor also includes an inert liquid contained in the cavity, the surface level of the inert liquid varies according to the tilt angle of the reference plane, and a signal processing circuit formed on a second surface of the printed circuit board, the signal processing circuit section producing an output signal corresponding to a difference in capacitance between the two capacitors as a tilt angle detection output.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The present invention is an integrated tilt sensor that can measure the tilt angle of a structure in which the sensor is mounted with respect to a reference axis. The integrated tilt sensor generates a signal proportional to the angle of tilt of the sensor. The sensor can be used to form a part of a closed loop control system, or as an indicator. Intone embodiment, the sensor incorporates a sense element and signal conditioning electronics on the same structure.

Figure 1:
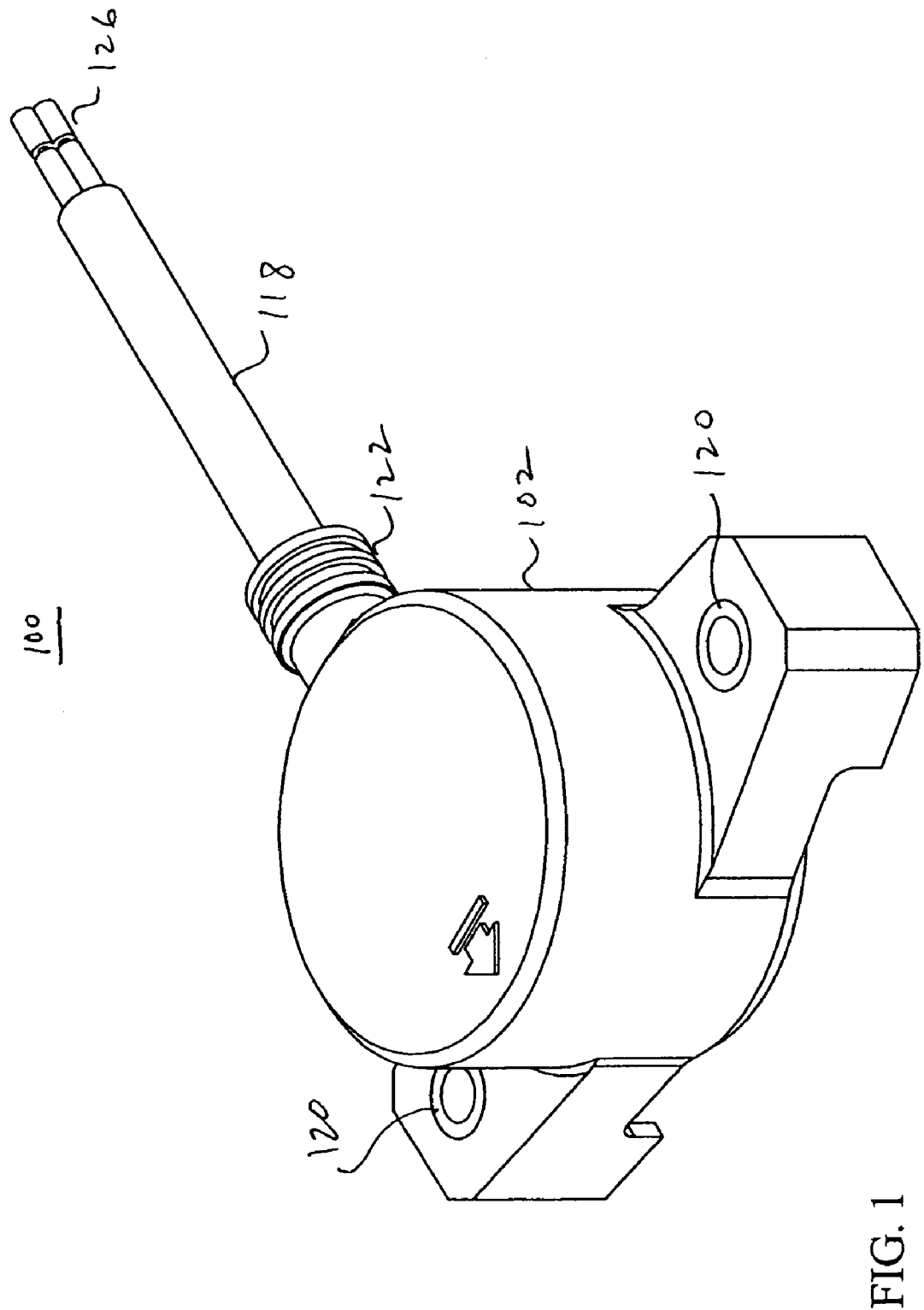
FIG. 1 is a perspective view of a tilt sensor configured in accordance to a preferred embodiment of the present invention.

FIG. 1 is a perspective view of a tilt sensor 100 configured in accordance to a preferred embodiment of the present invention, including a sensor cover 102 having a cable feed-through 122 from which a wiring harness 118 for connecting tilt sensor 100 extends, and a pair of mounting holes 120 for mounting to a location of interest, such as a firewall of a vehicle. It should be noted that tilt sensor 100 can be mounted on any plane whose tilt angle is to be detected, and the use of the sensor is not necessarily limited to any particular application unless otherwise stated herein. Wiring harness 118 includes a group of sensor circuit assembly connectors 124 to connect to a ribbon cable 104. Wiring harness 118 also includes a group of sensor wires 126 for connecting tilt sensor 100 to an external circuit.

Figure 2:
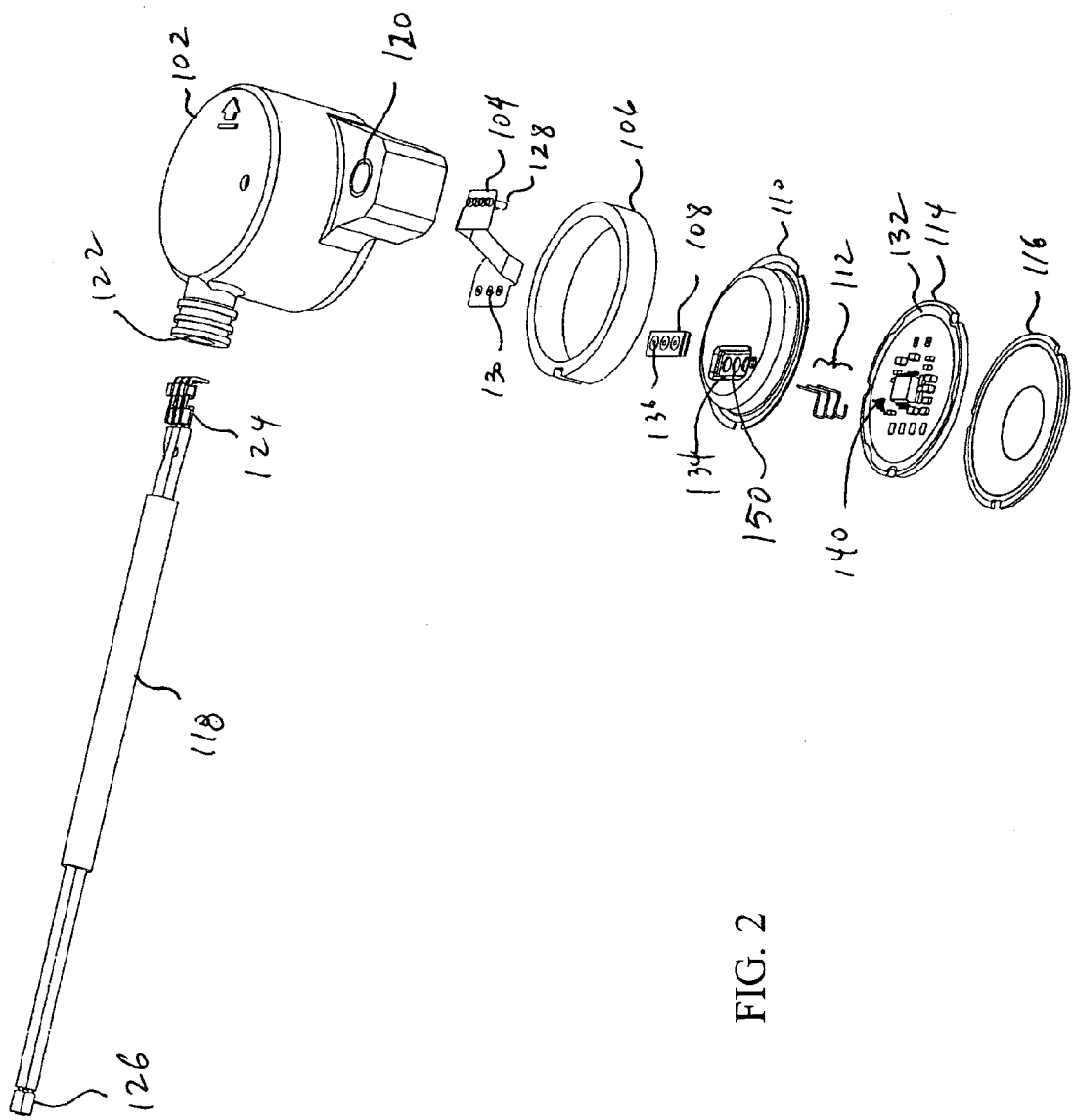
FIG. 2 is an exploded perspective view of the tilt sensor of FIG. 1.
Figure 3:
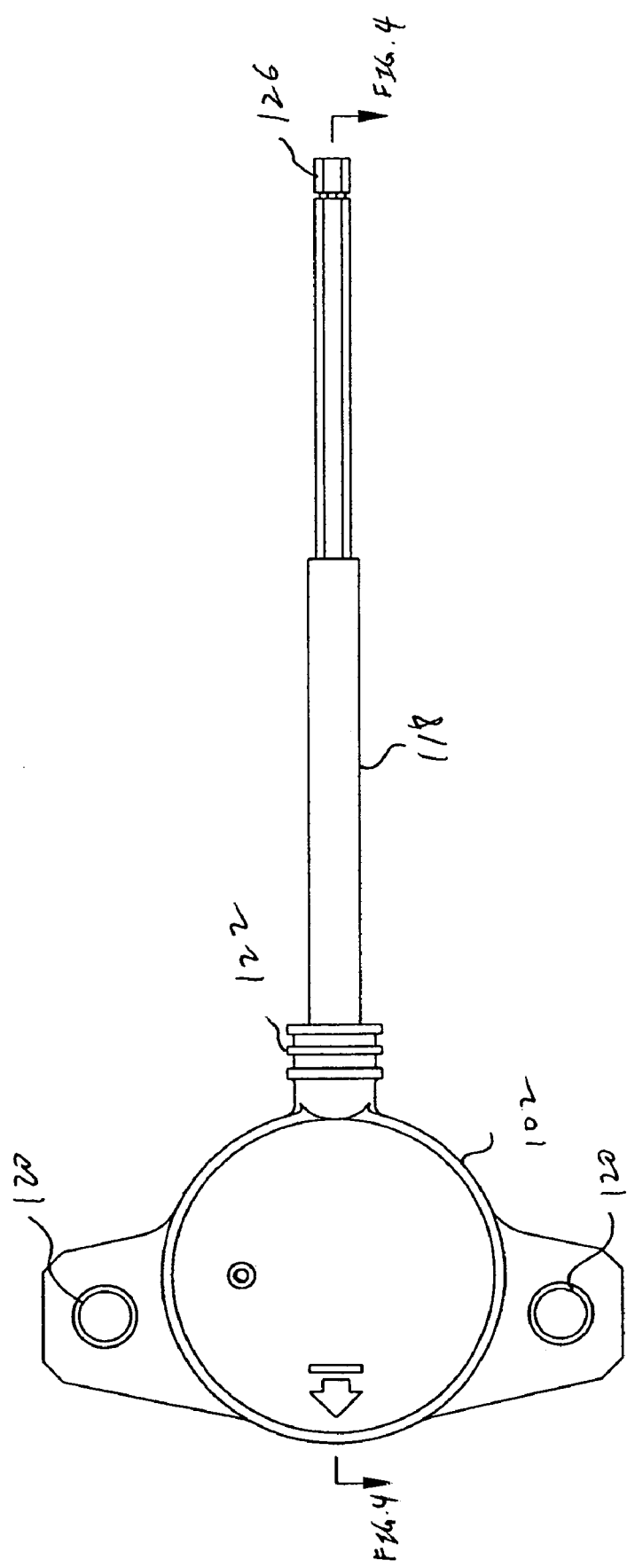
FIG. 3 is a front elevational view of the tilt sensor of FIG. 1.
Figure 4:
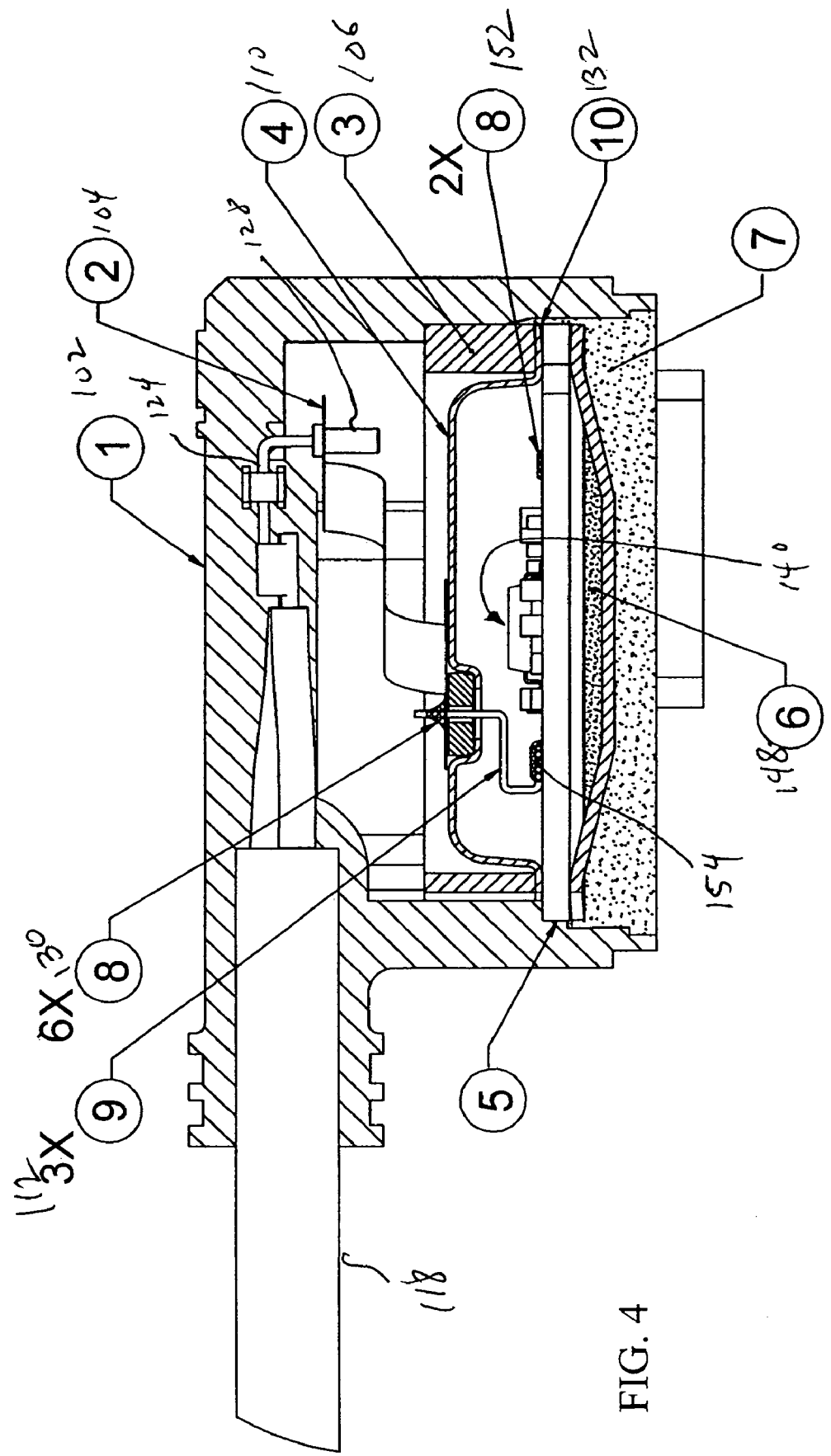
FIG. 4 is a cross-sectional view of the tilt sensor of FIG. 1, taken along line 4-4.
Figure 7:
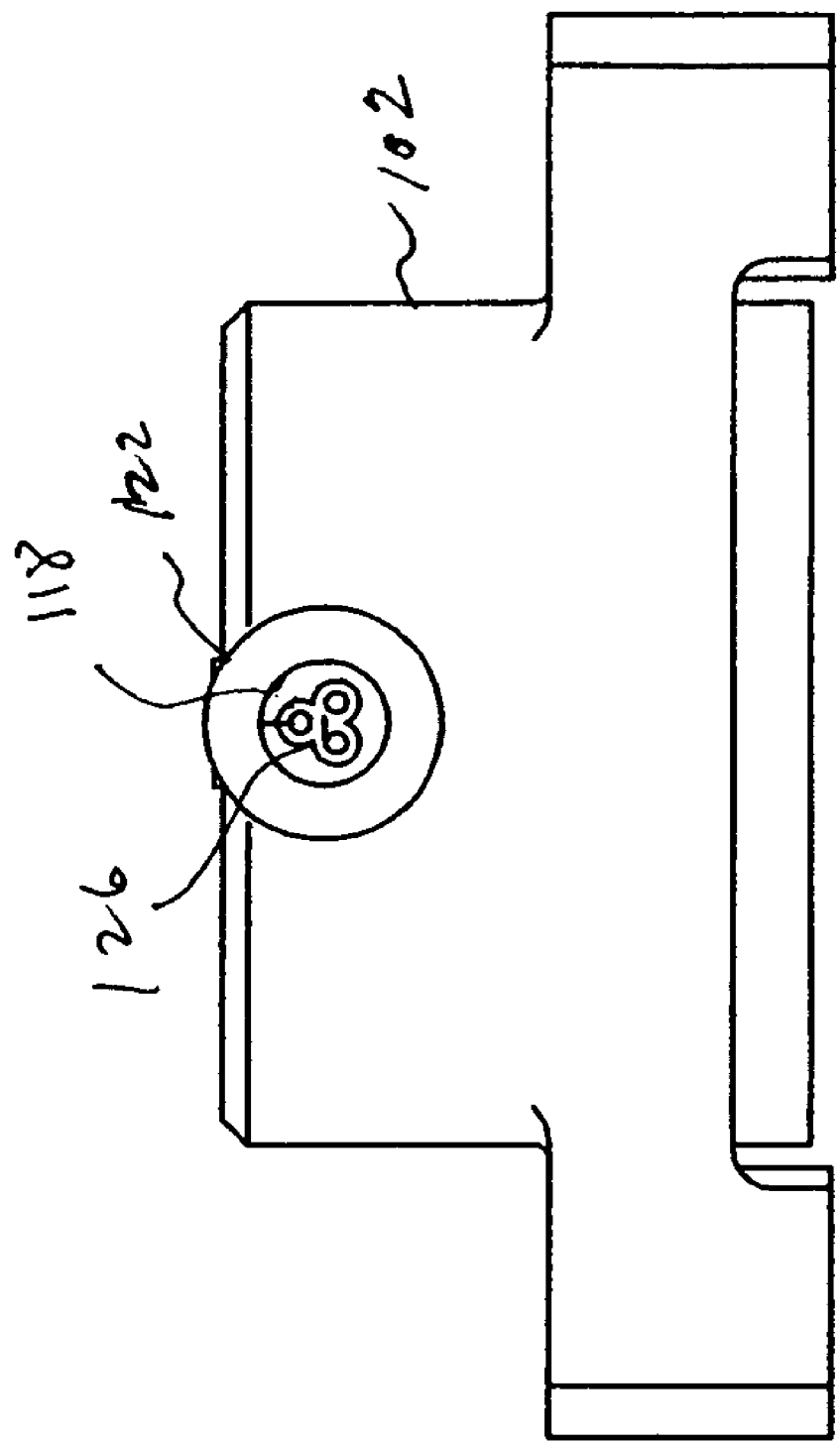
FIG. 7 is a bottom plan view of the tilt sensor of FIG. 1.

As illustrated in FIG. 2, FIG. 4 and FIG. 7, a printed circuit board (PCB) assembly 114 contains a sense element 142 and electronic circuitry 140 necessary for generating a high-level signal proportional to a tilt angle measured by sense element 142. PCB assembly 114 is a dual-sided PCB, with electronic circuitry 140 being integrated on one surface of PCB assembly 114 and covered by a feed-through plate 110. Sense element 142 is disposed on an opposite side of PCB assembly 114, as described herein.

In one embodiment, tilt sensor 100 uses an inert, nonconductive liquid or fluid 148 such as silicone oil and measures the change of the capacitance based on the movement of the fluid to determine an angle of tilt of the sensor. As such, it is impervious to the magnitude of gravity and mainly measures the angle of the gravity vector. In other embodiments, any non-conductive fluid with a dielectric constant greater than or equal to air may be used. Inert fluid 148 is sealed in a cavity formed by a PCB cover 116 and PCB assembly 114. The cavity is partially filled with inert fluid 148 and sealed. In one embodiment, approximately 50% of the volume is filled. This will allow the sensor to be tilted by 90 degrees in either direction. In another embodiment, a fill level of within +/−5% of 50% of the volume is tolerable for most applications. Further, in one embodiment, a solder mask or glass passivation is used to cover PCB assembly 114 to prevent soaking of inert fluid 148 into the circuit board. In another embodiment, PCB assembly 114 may be coated with another protective barrier, such as a non-conductive coating such as one made from Teflon(™) or silicon.

Figure 5:
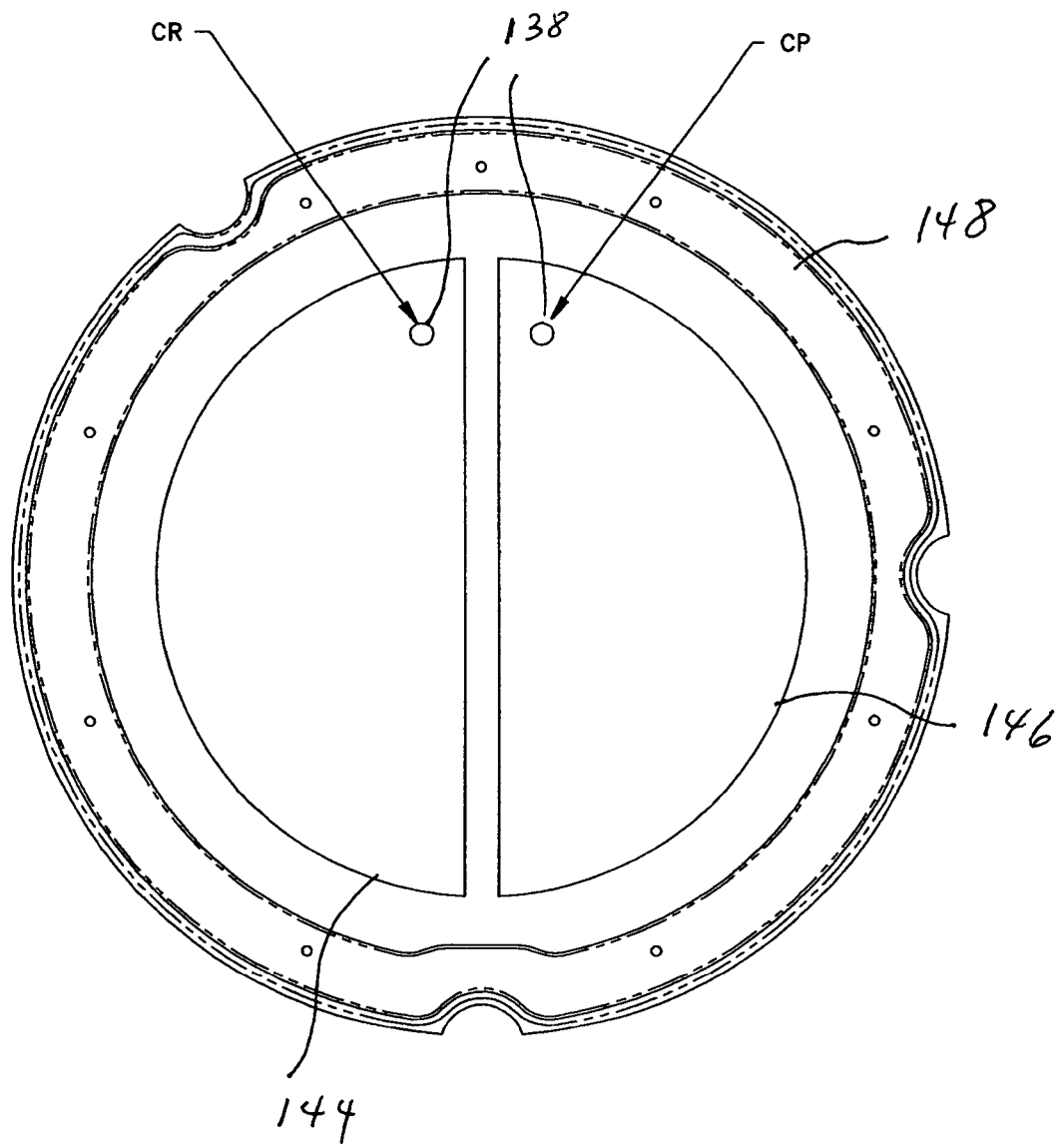
FIG. 5 is a back elevational view of a circuit board of the tilt sensor of FIG. 1.

Referring to FIG. 5, sense element 142 includes a pair of capacitative electrodes 144 and 146 etched out on the back side of PCB assembly 114, each forming one of the electrodes in two separate capacitor sense elements, referred to herein as Cr and Cp, respectively. In one embodiment, PCB cover 116 is a conductive metal cover, and functions as a common electrode to pair of capacitative electrodes 144 and 146 such that the two electrodes form two capacitor sense elements. When tilt sensor 100 is tilted from the 0 angle, inert fluid 148 is redistributed, creating an imbalance of capacitance between Cp and Cr. This capacitance change is detected, and amplified to a high level signal by an applications specific integrated circuit (ASIC) contained in electronic circuitry 140. In one embodiment, metallization of PCB assembly 114 is used to form the sensing element (pair of capacitative electrodes 144 and 146), as well as provide a shield for the on-board electronics (electronic circuitry 140). For example, a ring 148 is located on the side of PCB assembly 114 that is enclosed by PCB cover 116. In one embodiment, PCB cover 116 is sealed to PCB assembly 114 by attaching PCB cover 116 to ring 148 via metal reflow techniques such as soldering. Feed-through plate 110, PCB cover 116, and the metallization layer on PCB assembly 114 forms the shield and protects tilt sensor 100 from electromagnetic interference.

Once PCB cover 116 is attached to PCB assembly 114, the cavity formed by PCB cover 116 and PCB assembly 114 is partially filled with inert fluid 148 through a pair of through or fill holes 138. Pair of fill holes 138 also facilitates the filling, of the fluid—one hole is used for filling, and the other hole is used as vent during the filling. Once cavity has been filled with inert fluid 148, pair of fill holes 138 is sealed. Pair of fill holes 138 may be sealed with any suitable mechanical or chemical seal. In one embodiment, the seal is effected by a pair of solder plugs 252. In other embodiments, glue (e.g., epoxy) or some other mechanical plug may be used to seal pair of fill holes 138. In one embodiment, the pair of fill holes 138 are plated with a conductive interior surfaces to provide the electrical connection from pair of capacitative electrodes 144 and 146, on one side of PCB assembly 114, to electronic circuitry 140, on the other side of PCB assembly 114. Then, similar to how PCB cover 116 is attached to PCB assembly 114, feed-through plate 110 is attached to PCB assembly 114 by being soldered to a ring 132.

Figure 6:
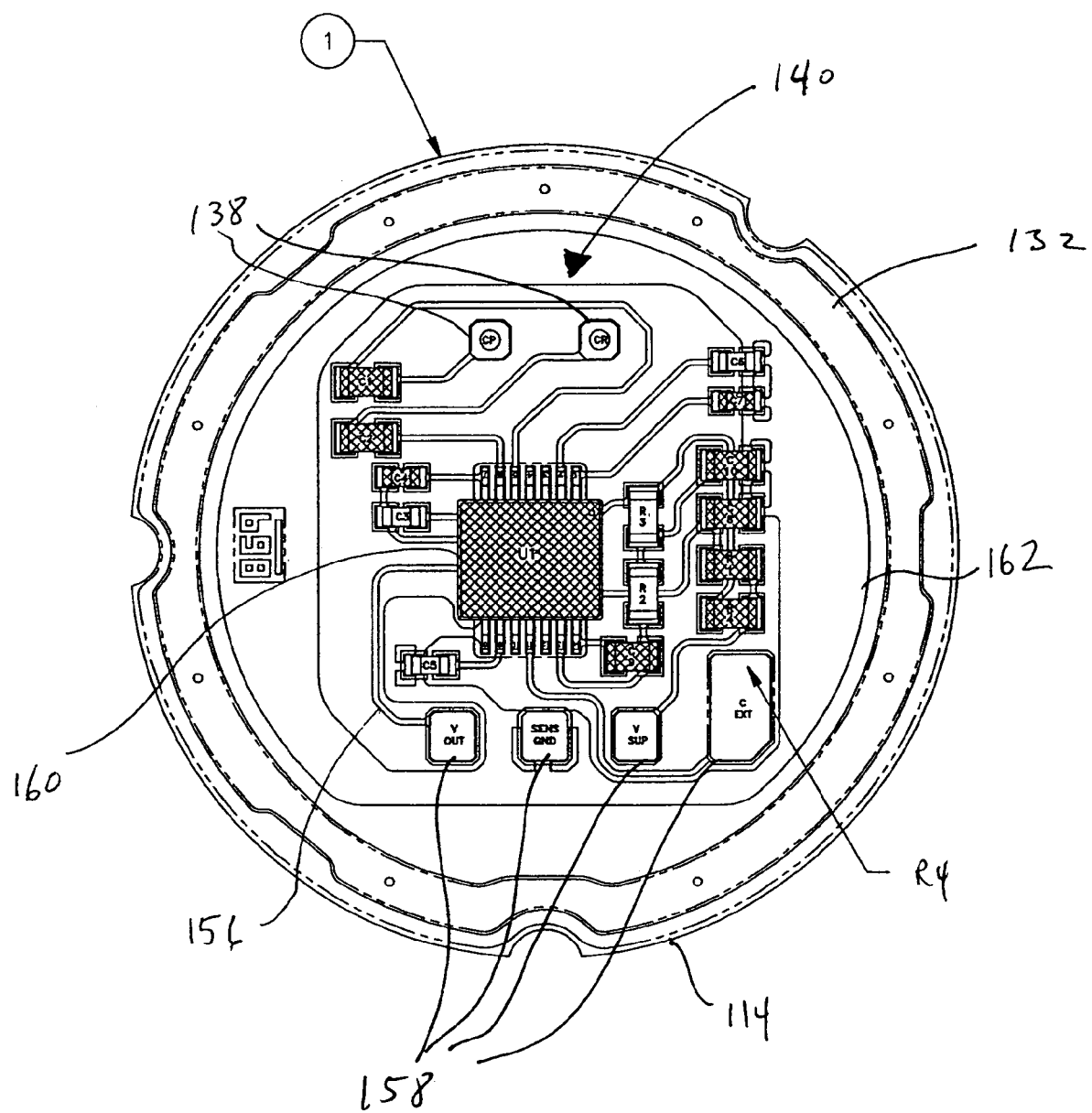
FIG. 6 is a front elevational view of the circuit board of the tilt sensor of FIG. 1.

FIG. 6 illustrates the components in electronic circuitry 140 as laid out on a circuit 156. Electronic circuitry 140 includes a group of I/O pads 158 for connection to wiring harness 118, including a C-EXT pad used as a digital download I/O to download data from an external computer to communicate with electronic circuitry 140. A custom ASIC 160 is used to control the operation of sensor 100 as well as detect the tilt through an analysis of the detected differential capacitance values. A ground pad 162 is used as a ground for electronic circuitry 140.

The electrical coupling of wiring harness 118 to electronic circuitry 140 in accordance with one embodiment of the present invention is described as follows. First, a set of lead wires 112 is soldered to group of I/O pads 158 at a group of attachment points 154 to provide connectivity to electrical circuitry 140. Lead wires 112 passes through a set of pass-through holes 150 in feed-through plate 110 and a set of openings 136 in a feed-through capacitor 108. Feed-through plate 110 is attached to PCB board assembly at this point. Feed-through capacitor 108 is used to provide immunity to electromagnetic interference (EMI). Feed-through capacitor 108 is not necessary it the sensor is used in an environment with low interference. Lead wires 112 is then soldered to a ribbon cable 104 with a set of solder joints 130. Group of sensor circuit assembly connectors 124 of wiring harness 118 is connected to ribbon cable 104 via a set of mounting receptors 128 on ribbon cable 104. Ribbon cable 104 allows tilt sensor 100 to be more easily assembled as PCB board assembly 114 and its associated covers can be placed into the cavity of sensor cover 102. A spacer 106 is used to maintain proper distance between the top surface of feed-through plate 110 and the interior of sensor cover 102.

Figure 8:
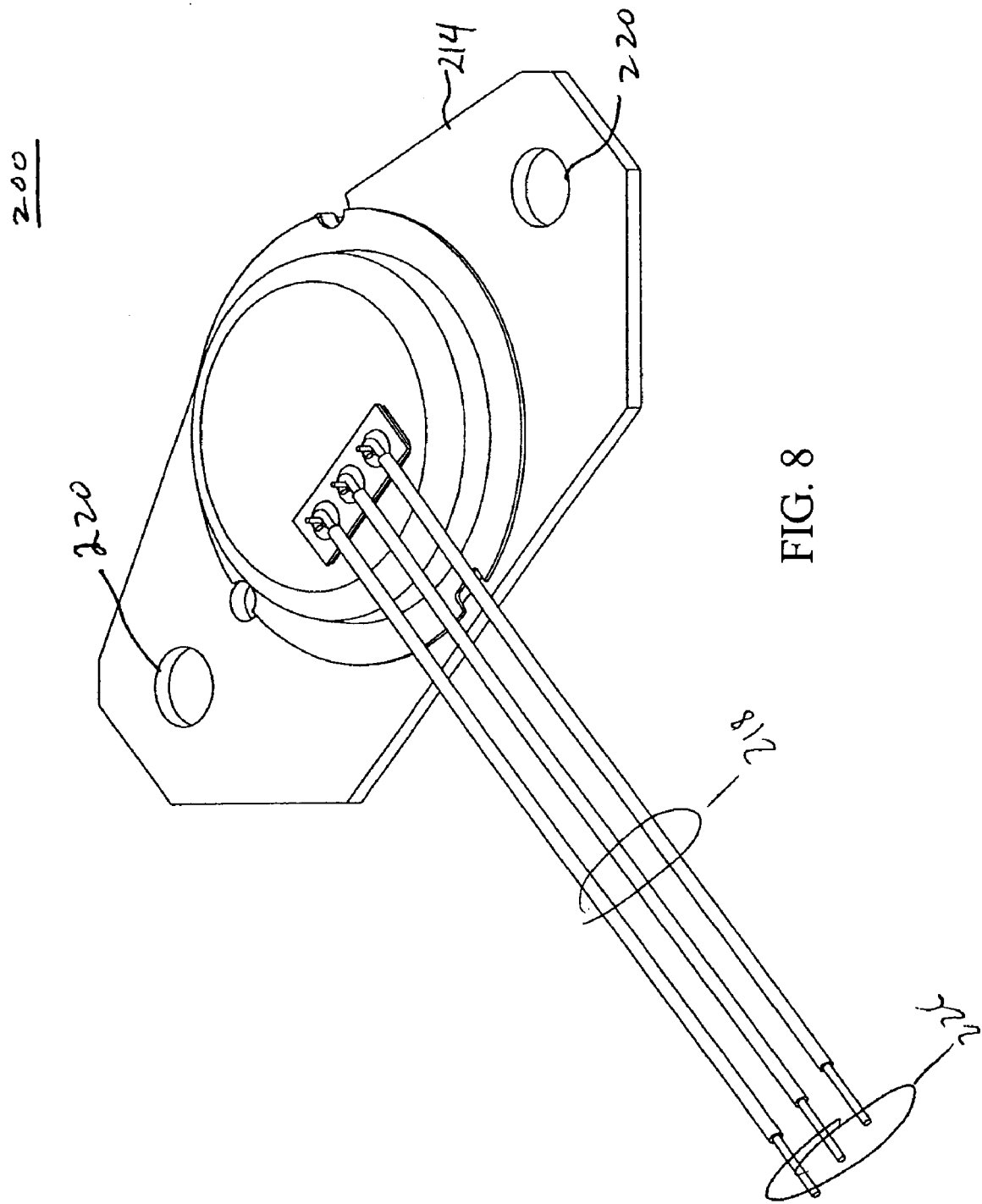
FIG. 8 is a perspective view of a tilt sensor configured in accordance to another preferred embodiment of the present invention.

FIG. 8 illustrates a tilt sensor 200 configured in accordance to a second embodiment of the present invention that unlike to tilt sensor 100, does not include a tilt sensor cover. Tilt sensor 200 includes a set of wires 218 for connecting tilt sensor 200 to an external circuit. Tilt sensor 200 also includes a pair of mounting holes 220 for mounting to a location of interest, such as a firewall of a vehicle. Set of wires 218 includes a group of sensor circuit assembly connectors 224 to connect to a set of lead wires 212. Set of wires 218 also includes a group of sensor wires 226 for connecting tilt sensor 200 to an external circuit.

Figure 9:
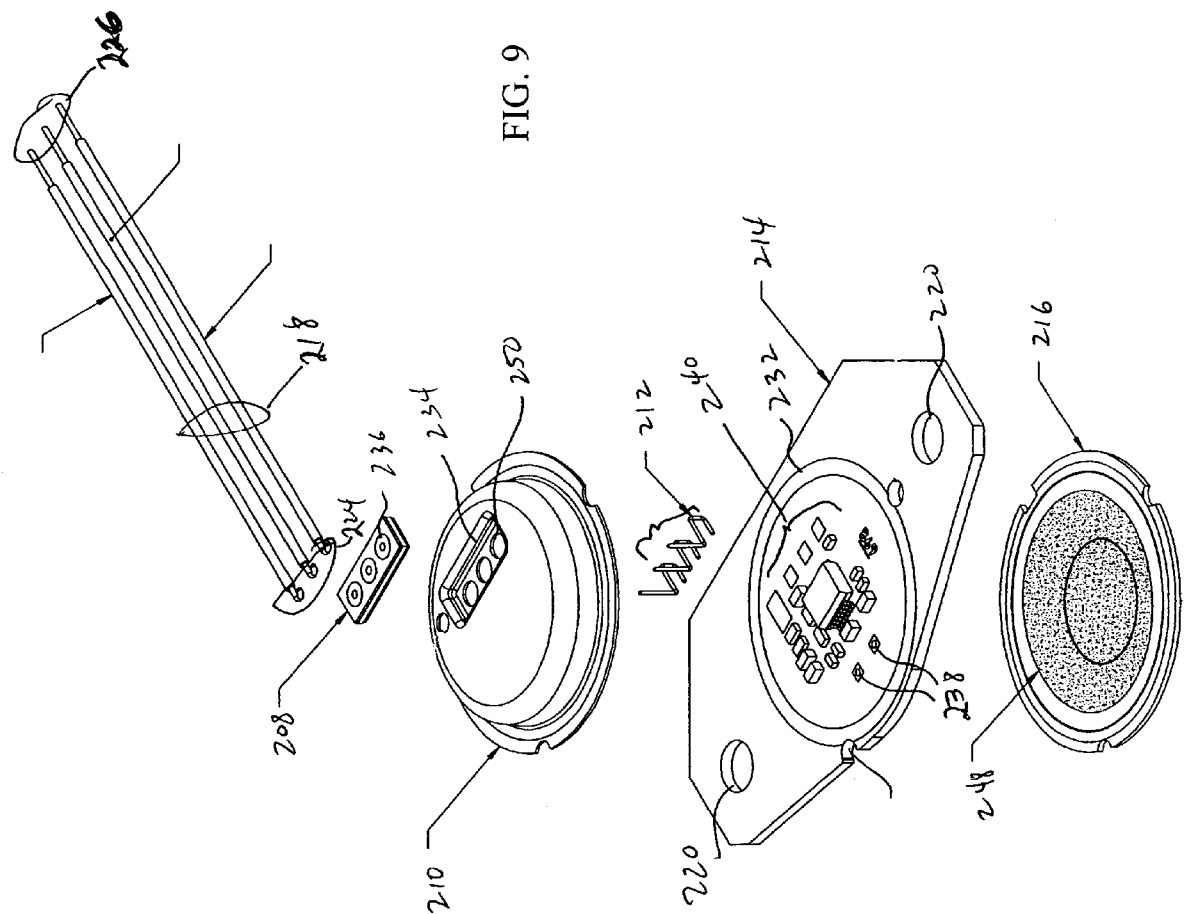
FIG. 9 is an exploded perspective view of the tilt sensor of FIG. 8.
Figure 10:
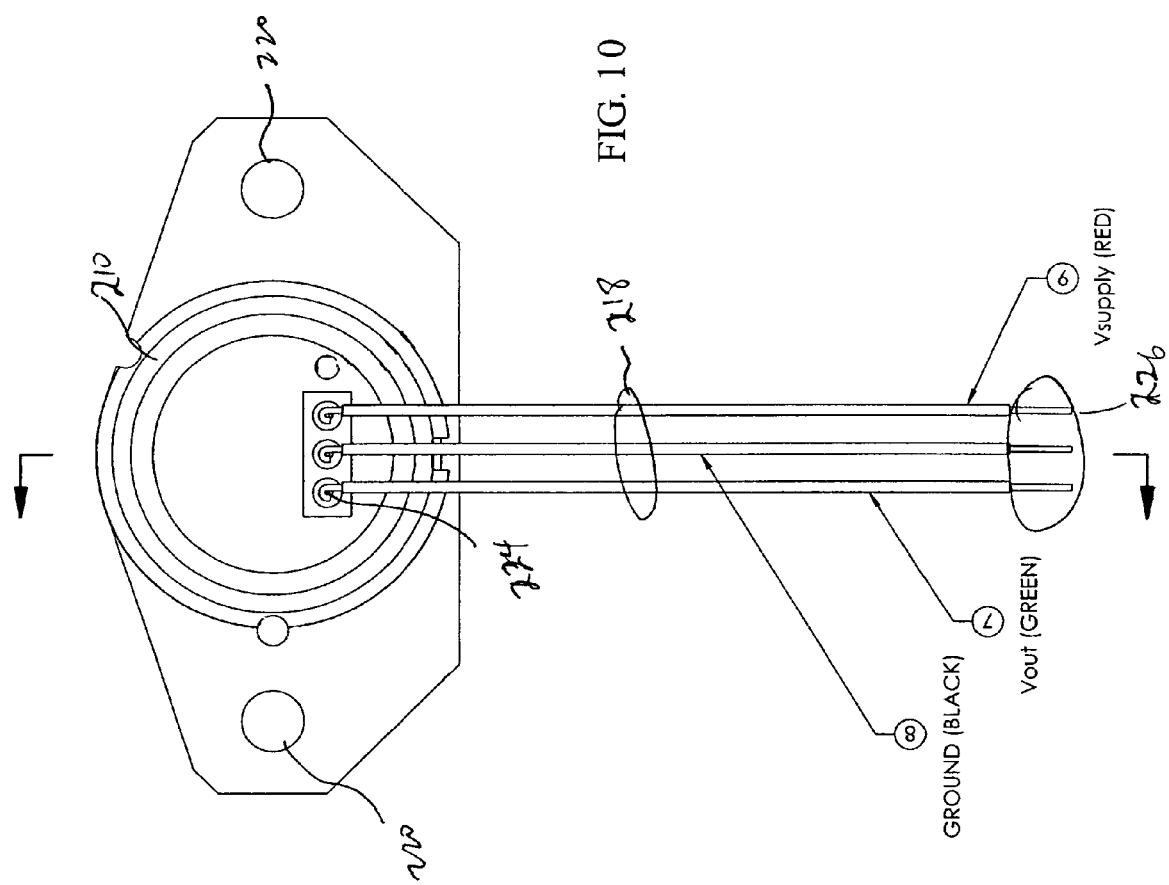
FIG. 10 is a front elevational view of the tilt sensor of FIG. 8.
Figure 11:
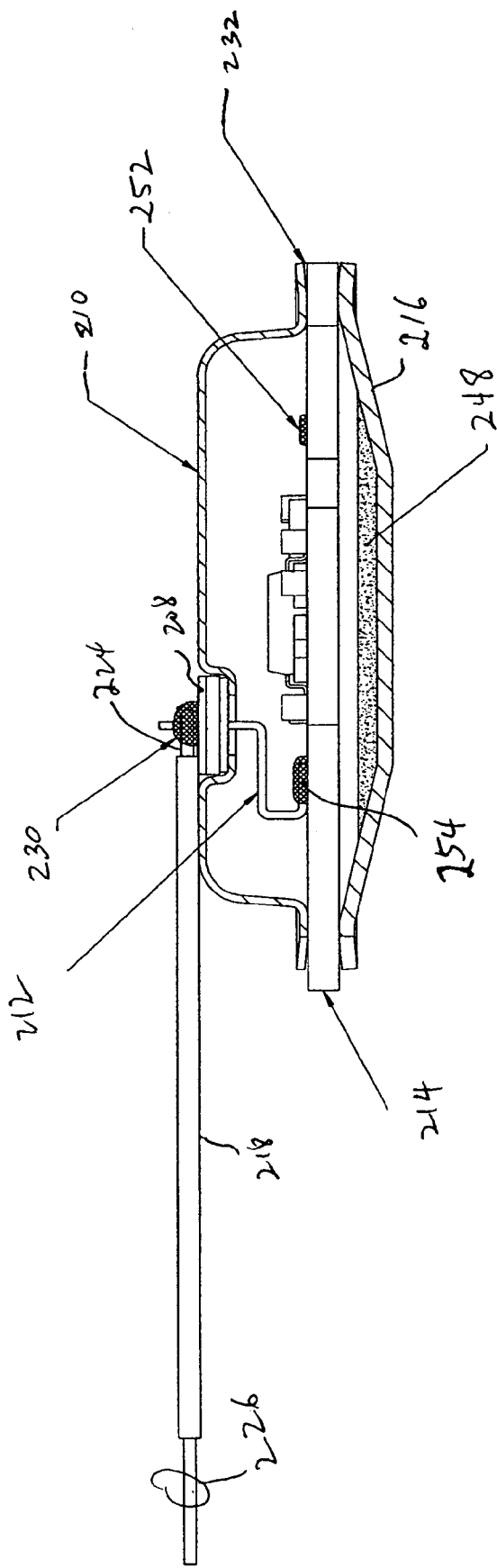
FIG. 11 is a cross-sectional view of the tilt sensor of FIG. 8, taken along line 11-11.
Figure 12:
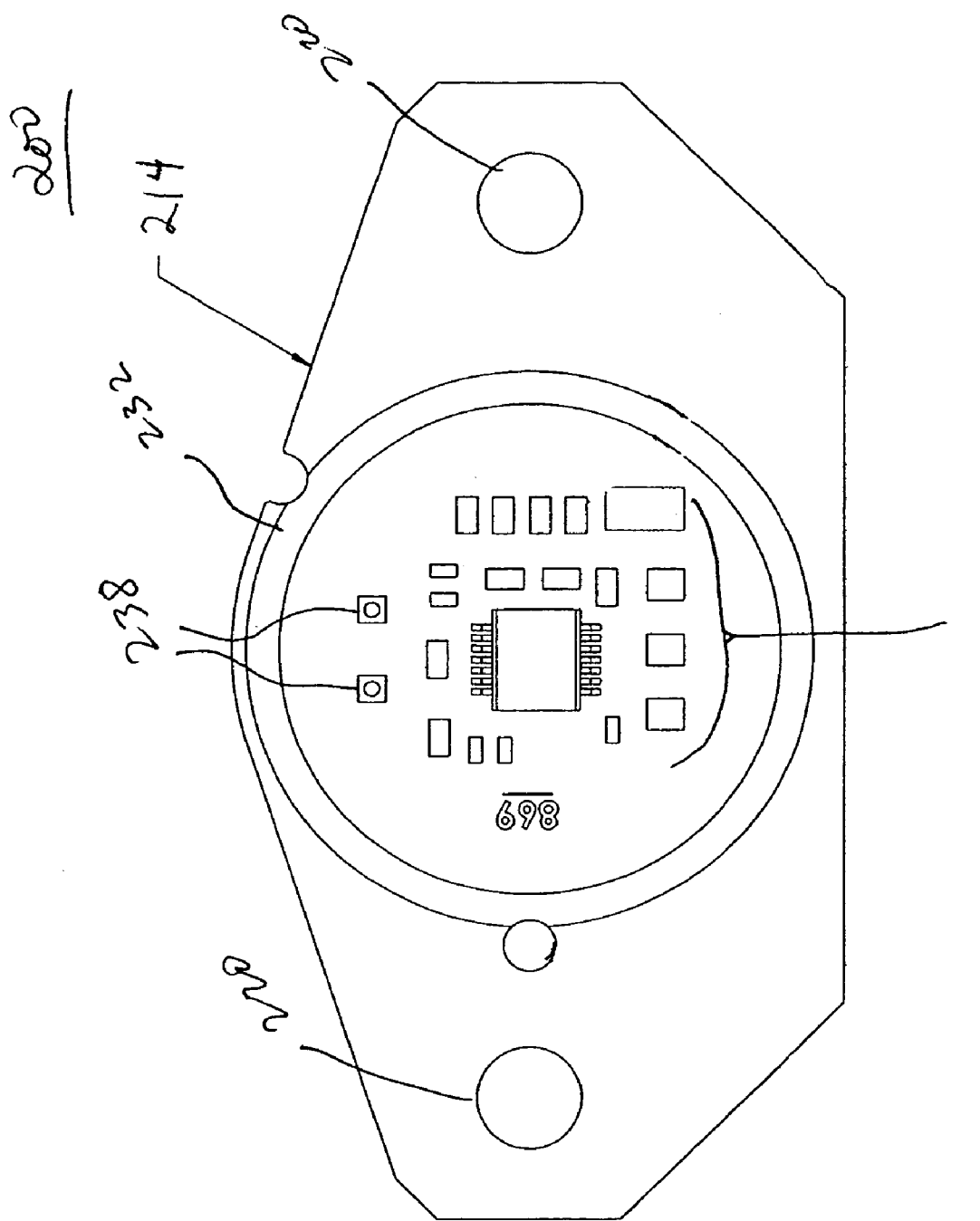
FIG. 12 is a front elevational view of a circuit board of the tilt sensor of FIG. 8.
Figure 13:
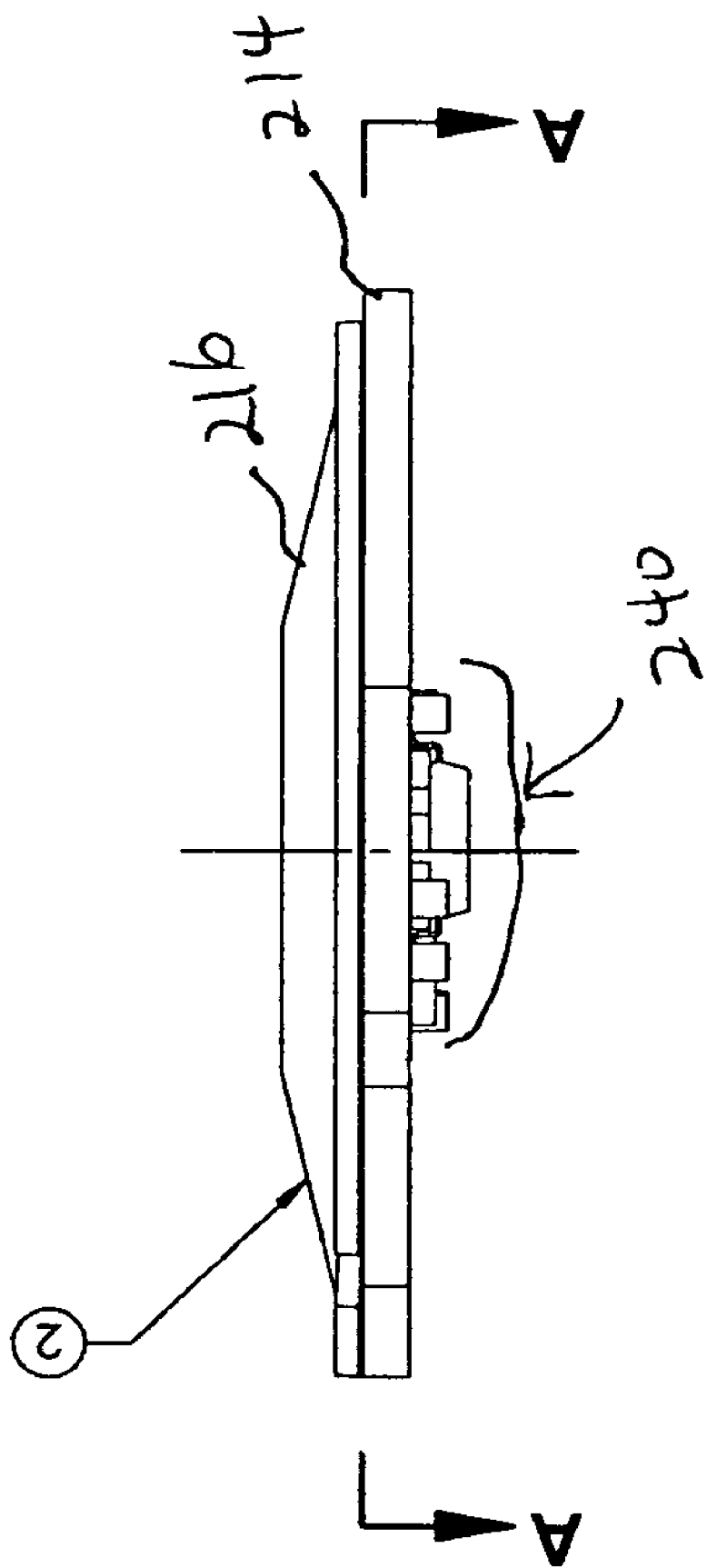
FIG. 13 is a side elevational view of the circuit board of the tilt sensor of FIG. 8.

As shown in FIG. 9 and FIG. 11, a printed circuit board (PCB) assembly 214 contains a sense element 242 and electronic circuitry 240 necessary for generating a high-level signal proportional to a tilt angle measured by sense element 242. PCB assembly 214 is a dual-sided PCB, with electronic circuitry 240 being integrated on one surface of PCB assembly 214 and covered by a feed-through plate 210. Sense element 242 is disposed on an opposite side of PCB assembly 214, as described herein.

In one embodiment, tilt sensor 200 uses an inert, nonconductive liquid or fluid 248 similar to inert nonconductive fluid 148 and measures the change of the capacitance based on the movement of the fluid to determine an angle of tilt of the sensor. Inert fluid 248 is sealed in a cavity formed by a PCB cover 216 and PCB assembly 214. The cavity is only partially filled with inert fluid 248 and sealed with reflowing of metals. Specifically, in one embodiment, inert fluid 248 is filled into one hole of pair of fill holes 138, and the other hole is used as a vent during the filling. Similar to PCB assembly 114, a solder mask or glass passivation is used to cover PCB assembly 214 to prevent soaking of inert fluid 248 into the circuit board. Also, other protective barriers may be used to coat PCB assembly 214. Metalization of PCB assembly 214 is used to form parts of the sensing elements as well as provide a shield for the on-board electronics (e.g., electronic circuitry 240).

Figure 14:
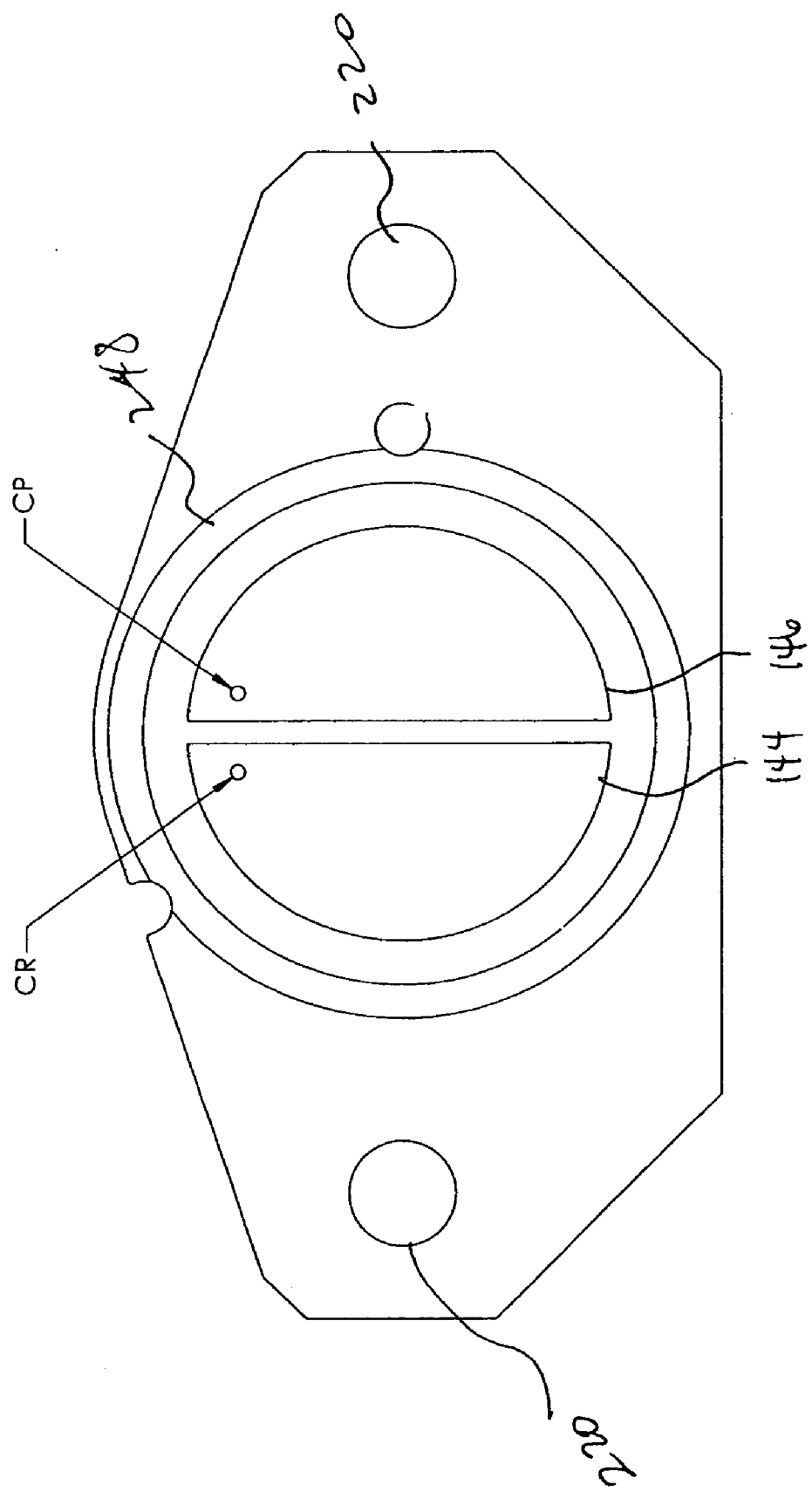
FIG. 14 is a back elevational view of a circuit board of the tilt sensor of FIG. 8.
Figure 15:
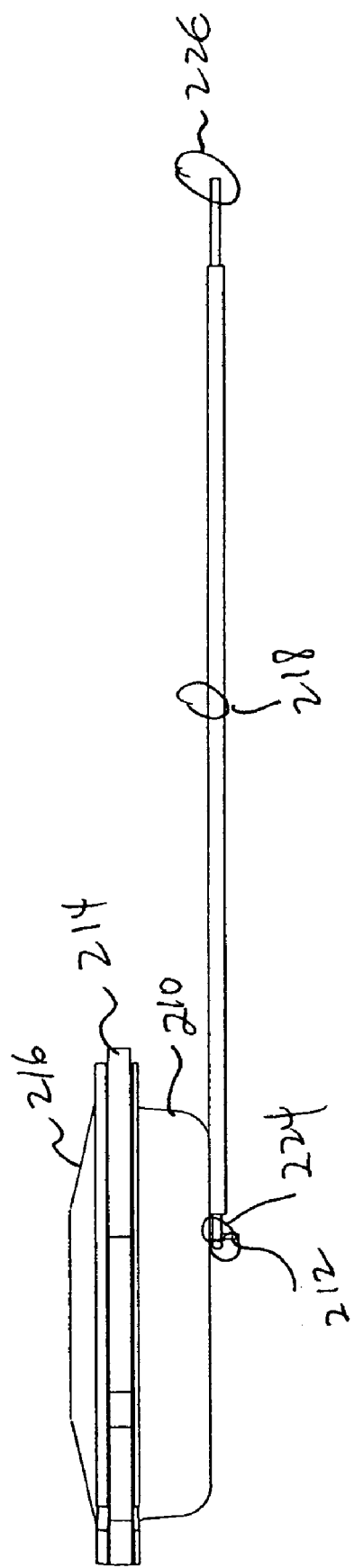
FIG. 15 is a side elevational view of the tilt sensor of FIG. 8.
Figure 16:
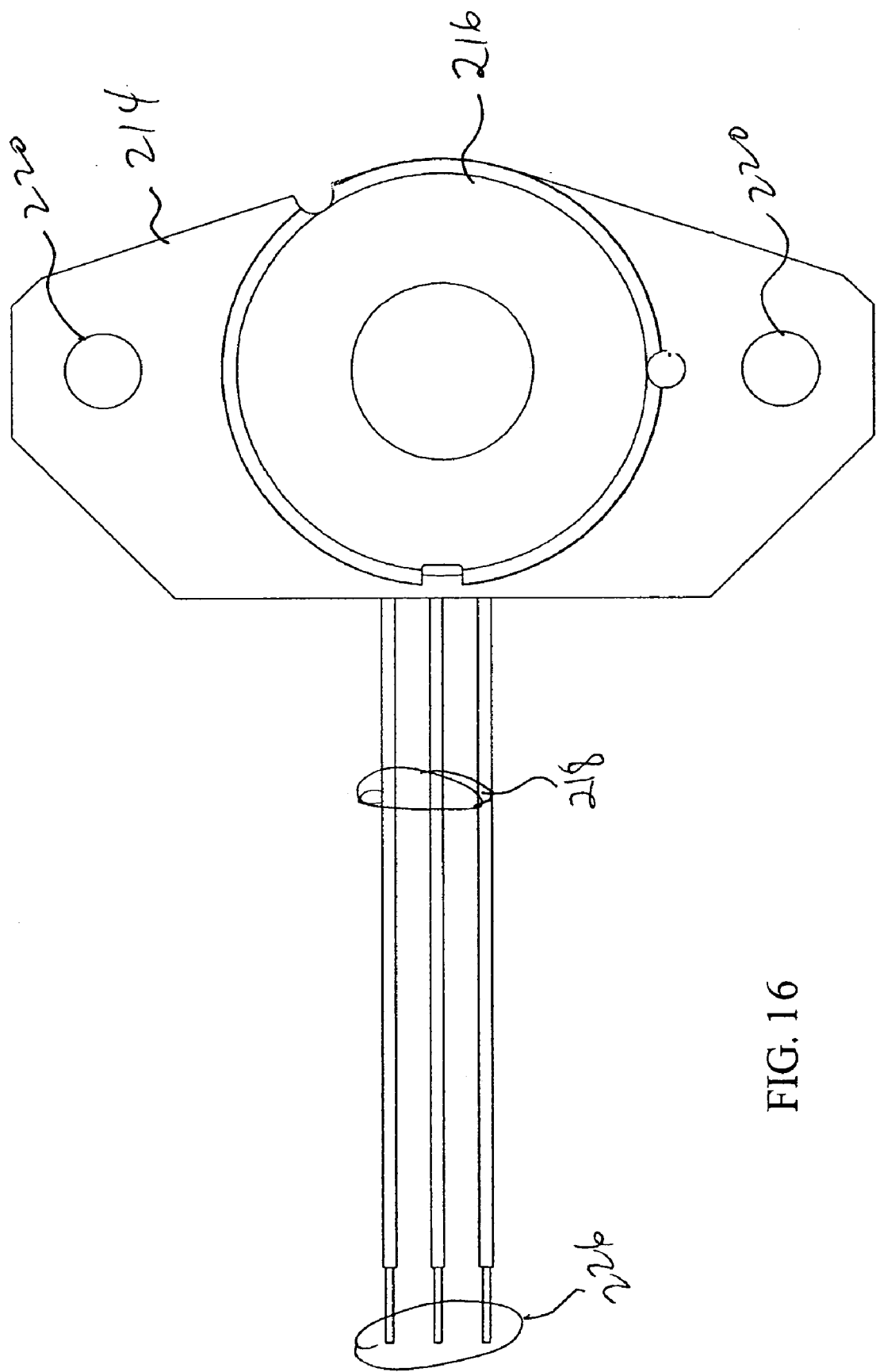
FIG. 16 is a back elevational view of the tilt sensor of FIG. 8.

Referring to FIG. 14, similar to sense element 142 of tilt sensor 100, sense element 242 of tilt sensor 200 includes a pair of capacitative electrodes 244 and 246 etched out on the back side of PCB assembly 214, each forming one of the electrodes in two separate capacitor sense elements, referred to herein as Cr and Cp, respectively. Similarly, PCB cover 216 is a metal cover, and functions as a common electrode to pair of capacitative electrodes 244 and 246 such that the two electrodes form two capacitor sense elements. When tilt sensor 200 is tilted from the 0 angle, inert fluid 248 is redistributed, creating an imbalance of capacitance between Cp and Cr. This capacitance change is detected, and amplified to a high level signal by a custom ASIC contained in electronic circuitry 240. As discussed, metallization of PCB assembly 214 is used to form the sensing element as well as provide a shield for the on-board circuitry.

PCB cover 216 of tilt sensor 200 is sealed in the same fashion as PCB cover 116 of tilt sensor 100. Specifically, PCB cover 216 is sealed to PCB assembly 214 by attaching PCB cover 216 to a ring 248 via metal reflow techniques such as soldering. Similar to the process as described for tilt sensor 100, once PCB cover 216 is attached to PCB assembly 214, the cavity formed by PCB cover 116 and PCB assembly 214 is partially filled with inert fluid 248 through a pair of fill (through) holes 238. Once cavity has been filled with inert fluid 248, the pair of fill holes 238 is sealed with a pair of plugs 252. The pair of fill holes 238 may be sealed with any suitable mechanical or chemical seal. In one embodiment, the sealing is done with solder. In another embodiment, the pair of fill holes 238 are sealed using glue (e.g., epoxy). In yet another embodiment, a screw or other mechanical plug may be used. Similar to how PCB cover 116 is attached to PCB assembly 214, feed-through plate 210 is attached to PCB assembly 214 by being soldered to a ring 232.

The electrical coupling of set of wires 218 to electronic circuitry 240 in accordance with one embodiment of the present invention is described as follows. First, a set of lead wires 212 is soldered to PCB assembly 214 to provide connectivity to electrical circuitry 240. Lead wires 212 passes through a set of pass-through holes 250 in feed-through plate 210 and a set of openings 236 in a feed-through capacitor 208. Feed-through plate 210 is then attached to PCB board assembly through a reflow process. Similar to feed-through capacitor 108, feed-through capacitor 208 is used to protect from EMI. Lead wires 212 is then soldered to a group of sensor circuit assembly connectors 224 on wiring harness 218 with a set of solder joints 230.

In one preferred embodiment, a voltage range of 0.5 volts to 4.5 volts is used, the end points of the voltage range representing the minimum tilt angle to a maximum tilt angle for which the sensor is configured to detect, respectively, with a mid-point of 2.5 volts. Thus, where the sensor is configured to detect a maximum tilt angle ranging from −90 degrees to +90 degrees, the voltage will range from 0.5 volts for a detected angle of −90 degrees and 4.5 volts for a detected angle of +90 degrees. In one preferred embodiment, the range of tolerance is within 5%. In another preferred embodiment, the range of tolerance is within 10%. In other embodiments, the output voltages can be reversed such that when tilt sensor 100 detects a maximum tilt angle, it will output 0.5 volts and it will output 4.5 volts when it detects a minimum tilt angle. Other ranges of voltages or currents may be used to represent detected tilt angles.

The embodiments described above are exemplary embodiments of a tilt sensor configured in accordance with the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A tilt sensor comprising:
    a printed circuit board disposed in a direction generally normal to a reference plane for measuring a tilt angle;
    a pair of electrodes formed on a first portion of the printed circuit board;
    a cover affixed to the printed circuit board and creating a cavity between the cover and the first surface of the printed circuit board, the cover being adjacent to the pair of electrodes with a gap between the cover and the pair of electrodes, the cover used as a common electrode for the pair of electrodes, the cover and the pair of electrodes defining a pair of capacitors;
    an inert liquid contained in the cavity, the surface level of the inert liquid varying according to the tilt angle of the reference plane; and,
    a signal processing circuit formed on a second portion of the printed circuit board, the signal processing circuit producing an output signal corresponding to a difference in capacitance between the two capacitors as a tilt angle detection output.

2. The tilt sensor according to claim 1, wherein the cover is sealed to the printed circuit board to prevent leakage of the inert liquid.

3. The tilt sensor according to claim 1, wherein the circuit board includes a metal ring and the cover is operatively coupled to the metal ring.

4. The tilt sensor according to claim 3, wherein the cover is operatively coupled to the metal ring through metal reflow.

5. The tilt sensor to claim 1, wherein the first portion and the second portion of the circuit board are located on a first side and a second side of the circuit board, respectively.

6. The tilt sensor according to claim 1, wherein the cover is hermetically sealed to the printed circuit board.

7. The tilt sensor according to claim 1, wherein the cover is a conductive metal cover.

8. The tilt sensor according to claim 1, further comprising a second cover affixed to the printed circuit board, the signal processing circuit covered by the second cover.

9. The tilt sensor according to claim 1, wherein the printed circuit board is metalized.

10. The tilt sensor according to claim 1, wherein the first surface of the printed circuit board is sealed with glass passivation against the inert liquid.

11. The tilt sensor according to claim 10, further comprising a seal for each one of the plurality of through holes.

12. The tilt sensor according to claim 1, wherein the inert liquid fills the cavity up to a predetermined level.

13. The tilt sensor according to claim 1, wherein the circuit board includes a plurality of through holes.

14. The tilt sensor according to claim 13, wherein each of the pair of electrodes includes one of the plurality of through holes.

15. The tilt sensor according to claim 14, wherein signal processing circuit is electrically coupled to the pair of electrodes through the plurality of through holes.

16. The tilt sensor according to claim 13, wherein the plurality of through holes each comprises a metalized inner surface.

17. The tilt sensor according to claim 16, wherein signal processing circuit is electrically coupled to the pair of electrodes through the metalized inner surface.

18. The method of claim 17, further comprising the step of sealing the first surface of the printed circuit board with glass passivation against the inert fluid.

19. A method for assembling a tilt sensor using a circuit board comprising the steps of:
forming a pair of differential electrodes on a first portion of the circuit board;
creating a plurality of through holes in the differential electrodes;
forming a metal ring around the pair of differential electrodes;
forming an electrical circuit on a second portion of the circuit board;
coupling the electrical circuit to the pair of differential electrodes and the metal ring;
attaching a cover to the metal ring to form a cavity;
filling the cavity with a nonconductive liquid; and,
sealing the plurality of through holes.

20. The method of claim 19, wherein the circuit board includes a first side and a second side, and the first portion is located on the first side and the second portion is located on the second side.

21. The method of claim 19, further comprising coupling the metal ring to the electrical circuit.

22. The method of claim 21, further comprising the step of coupling a plurality of contacts to the electrical circuit.

23. The method of claim 22, further comprising the step of attaching a second cover to the second metal ring, the second cover having a plurality of openings, the plurality of contacts being inserted through the plurality of openings.

24. The method of claim 19, further comprising the step of plating the plurality of through holes.

25. The method of claim 19, further comprising the step of forming a second metal ring around the electrical circuit.

26. The method of claim 19, wherein the step of attaching the cover to the metal ring comprises sealing the cover to the metal ring.

27. The method of claim 26, wherein the step of sealing the cover to the metal ring comprises hermetically sealing the cover to the metal ring.

28. The method of claim 19, wherein the step of attaching the cover to the metal ring comprises reflowing metal around the cover.

29. The method of claim 19, wherein the step of sealing the plurality of through holes comprises soldering the plurality of through holes.

30. A tilt sensor comprising:
a circuit board having a first side and a second side;
a circuit located on the first side; and,
a differential capacitative sensor coupled to the circuit, the differential capacitative sensor comprising:
a pair of electrodes located on the second side;
a metal ring surrounding the pair of electrodes on the second side; and,
a cover affixed to the metal ring and spaced from the pair of electrodes to operate as a common electrode for the pair of electrodes to form a pair of capacitors, the cover having a cavity, wherein the pair of electrodes and the metal ring are electrically coupled to the circuit.

31. The tilt sensor of claim 30, further comprising an inert fluid contained within the cavity.

32. The tilt sensor of claim 31, wherein the cavity is sealed to avoid the loss of the inert fluid.

33. The tilt sensor of claim 30, wherein the cavity is hermetically sealed.

34. The tilt sensor of claim 30, further comprising a pair of through holes in the circuit board.

35. The tilt sensor of claim 34, wherein the pair of electrodes and the metal ring are electrically coupled to the circuit through the pair of through holes.

36. The tilt sensor of claim 30, wherein the pair of electrodes includes an inner surface coated with a conductive material.

37. The tilt sensor of claim 30, further comprising a second metal ring surrounding the circuit.

38. The tilt sensor of claim 37, further comprising a second cover attached to the second metal ring.

39. The tilt sensor of claim 30, wherein the circuit comprises a signal processing circuit producing an output signal corresponding to a difference in capacitance between the pair of capacitors as a tilt angle detection output.

* * * * *